(12) United States Patent
Yamazaki (10) Patent No.: US 6,183,332 B1
(45) Date of Patent: Feb. 6, 2001

(54) TOY

(75) Inventor: Tomohiro Yamazaki, Tokyo (JP)

(73) Assignee: Tomy Company, Limited, Tokyo (JP)

( * ) Notice: Under 35 U.S.C. 154(b), the term of this patent shall be extended for 0 days.

(21) Appl. No.: 09/161,779

(22) Filed: Sep. 29, 1998

(30) Foreign Application Priority Data

Oct. 20, 1997 (JP) .............................. 9-009281 U (51) Int. Cl.⁷ .................................................. A63H 31/00
(52) U.S. Cl. .............................. 446/103; 446/92; 446/118
(58) Field of Search ........................... 446/92, 102, 103, 446/118, 129, 137, 138; 434/276, 300

(56) References Cited

U.S. PATENT DOCUMENTS

| | | | |
|---|---|---|---|
| 2,994,154 | * | 8/1961 | McCaa ..................................... 446/90 |
| 3,172,666 | * | 3/1965 | Ryan ..................................... 446/103 |
| 3,193,293 | * | 7/1965 | Schaper ................................. 446/103 |
| 3,494,218 | * | 2/1970 | Fischer ................................. 446/103 |
| 3,608,233 | * | 9/1971 | Aoki ....................................... 446/92 |
| 3,881,274 | * | 5/1975 | Kanda ..................................... 446/103 |
| 3,965,610 | * | 6/1976 | Den Ouden ........................... 446/103 |
| 4,565,538 | * | 1/1986 | Kennedy et al. ..................... 446/462 |
| 5,194,031 | * | 3/1993 | Sahler ................................... 446/103 |
| 5,346,420 | * | 9/1994 | Glickman .............................. 446/90 |
| 5,411,428 | * | 5/1995 | Orii et al. .............................. 446/90 |

FOREIGN PATENT DOCUMENTS

| | | | |
|---|---|---|---|
| 138774 | * | 2/1903 | (DE) ..................................... 446/103 |
| 104716 | * | 4/1984 | (EP) ..................................... 446/103 |
| 1 278 532 | | 6/1972 | (GB) . |
| 1 299 019 | | 12/1972 | (GB) . |
| 3041412 | | 9/1997 | (JP) . |

* cited by examiner

*Primary Examiner*—Kien T. Nguyen
*Assistant Examiner*—Jeffrey D. Carlson
(74) *Attorney, Agent, or Firm*—Staas & Halsey LLP (57) ABSTRACT

An intellectual training toy has a large freedom of arrangement and enables connection between the driven ember and the rotary driving member even while the rotary driving member is rotating. The toy includes a base member which has a driving mechanism built-in and a field portion having a smooth surface. A rotary member is engaged with the driving mechanism and is rotatable around an axis perpendicular to the smooth surface of the field portion. A driving body having a rotary portion is attachable to the field portion of the base member so that the rotary portion is connected to the rotary member to rotate according to a rotation of the rotary member. A first driven body can be held at a desired position on the field portion of the base member by magnetic attraction force and can engage with the rotary portion of the driving body while being held on the field portion of the base member by a magnetic attraction force. The driven body has a first acting portion which takes action according to the rotation of the rotary portion.

14 Claims, 10 Drawing Sheets

TOY

BACKGROUND OF THE INVENTION

1. Field of the Invention

The present invention relates to a toy, in particular, to a toy and for intellectual training for a child or the like to play by joining a plurality of power transmission parts freely.

2. Description of Related Art

Conventionally, an intellectual training toy for a child and the like to play by assembling a plurality of power transmission parts is known, as disclosed in, for example, Japanese Utility Model Gazette No. 3,041,412. The intellectual training toy has a structure in which a square plate is disposed to fix on a field portion of a base member and a rotary driving member like a gear are provided on the square plate. The rotary driving member is connected to a handling disc which is arranged at a corner of the base member, through a driving mechanism provided inside the base member.

In the intellectual training toy, the rotary shaft of a gear-like rotary member of a driven member is inserted into one of small holes which are formed in the base member so that the driven member can be connected to the rotary driving member. Thus, the driven member can be rotated by rotation of the handling disc.

In such an intellectual training toy, because the relative position of the driven member to the rotary driving member is determined by the position of the holes formed in the base member, freedom of arrangement is restricted. In the structure of the intellectual training toy, because insertion of the rotary shaft into the hole can be performed only from the upper side, it is not possible to connect the driven member to the rotary driving member while the rotary driving member is rotating.

SUMMARY OF THE INVENTION

The invention has been made in view of the above problems.

It is an object of the invention to provide a toy which has a large freedom of arrangement and enables connection between the driven member and the rotary driving member even while the rotary driving member Is rotating.

In accordance with one aspect of the invention, the toy includes a base member which has a driving mechanism built-in and a field portion having a smooth surface; a rotary member which is engaged with the driving mechanism and is rotatable around an axis perpendicular to the smooth surface of the field portion; a driving member having a rotary portion, which is attachable to the field portion of the base member so that the rotary portion is connected to the rotary member to rotate according to a rotation of the rotary member; and a first driven member which can be held at a desired position on the field portion of the base member by magnetic attraction force and can engage with the rotary portion of the driving member while being held on the field portion of the base member by magnetic attraction force, the first driven member has a first acting portion which takes action according to the rotation of the rotary portion. One of the field portion of the base member and the first driven member may be made of magnetic material and the other of them may be made of a magnet.

According to such a toy, because the first driven member can be held at a desired position on the field portion of the base member by magnetic attraction force, it is possible to enhance the freedom for arrangement of the driven member and to increase interest thereto. The manner to connect the first driven member to the rotary portion of the driving member depends on the connection structure thereof. However, in the present invention, it is mostly possible to connect the first acting portion of the first driven member to the rotary portion of the driving member from the direction along the upper surface of the field portion, even while the rotary portion of the driving member is rotating. Therefore, it is unnecessary to stop the rotation of the rotary portion of the driving member prior to connecting the first driven member thereto.

Preferably, the rotary member is exposed from the field portion, and a shaft of the rotary portion of the driving member can be fitted with the rotary member.

According to the toy having such a structure, it is possible to connect the driving member to the rotary member easily and surely, by fitting the shaft of the rotary portion of the driving member with a portion of the exposed rotary member.

The rotary portion of the driving member and the first acting portion of the first driven member may be gears which can engage with each other. The gears may be spur gears, screw gears, or bevel gears.

According to the toy having such a structure, it is possible for a child or the like to have effective intellectual training to know the power transmission mechanism using gears.

The rotary portion of the driving member and the first acting portion of the first driven member may be rollers which can press against each other. The rollers may be cylindrical ones or conical ones.

According to the toy having such a structure, it is possible for a child to have effective intellectual training to know the power transmission mechanism using rollers.

The rotary portion of the driving member may form a crank, and the rotary portion of the driving member and the first acting portion of the first driven member may form a linkage.

According to the toy having such a structure, it is possible for a child to have effective intellectual training to know the power transmission mechanism using a linkage.

A cord member or a band member may be wrapped around the rotary portion of the driving member and the acting portion of the first driven member, to form a wrapping connector driving mechanism.

According to the toy having such a structure, it is possible for a child to have effective intellectual training to know the power transmission mechanism using a wrapping connector driving mechanism.

The toy may further include a second driven member which can be held at a desired position on the field portion of the base member by magnetic attraction force and can engage with the first driven member while being held on the field portion of the base member by magnetic attraction force, wherein the second driven member has an acting portion which takes action according to the action of the first driven member.

According to the toy having such a structure, because a plurality of driven members can be connected successively to transmit the power in turn, it is possible to increase interest thereto.

The toy may further include a first slide switch for changing a rotational direction of the rotary member, for example, by changing the rotation of a motor from normal direction to reverse one and vice versa. A second slide switch may be provided for changing a rotational speed of the rotary member by a movement thereof. The second slide switch may be mechanically communicated with a rotational speed changing member which can take first and second stable positions at which transmission of driving power from a motor to the rotary member is performed through trains of gears different from each other. Preferably, the rotational speed changing member has two branches which put a gear in the driving mechanism between them to move the gear by changing one of the first and second stable positions of the rotational speed changing member to the other, in order to change a train of gears used for transmission of driving power from the motor to the rotary member.

According to the toy having such a structure, it is possible to increase interest thereto.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Figure 1:
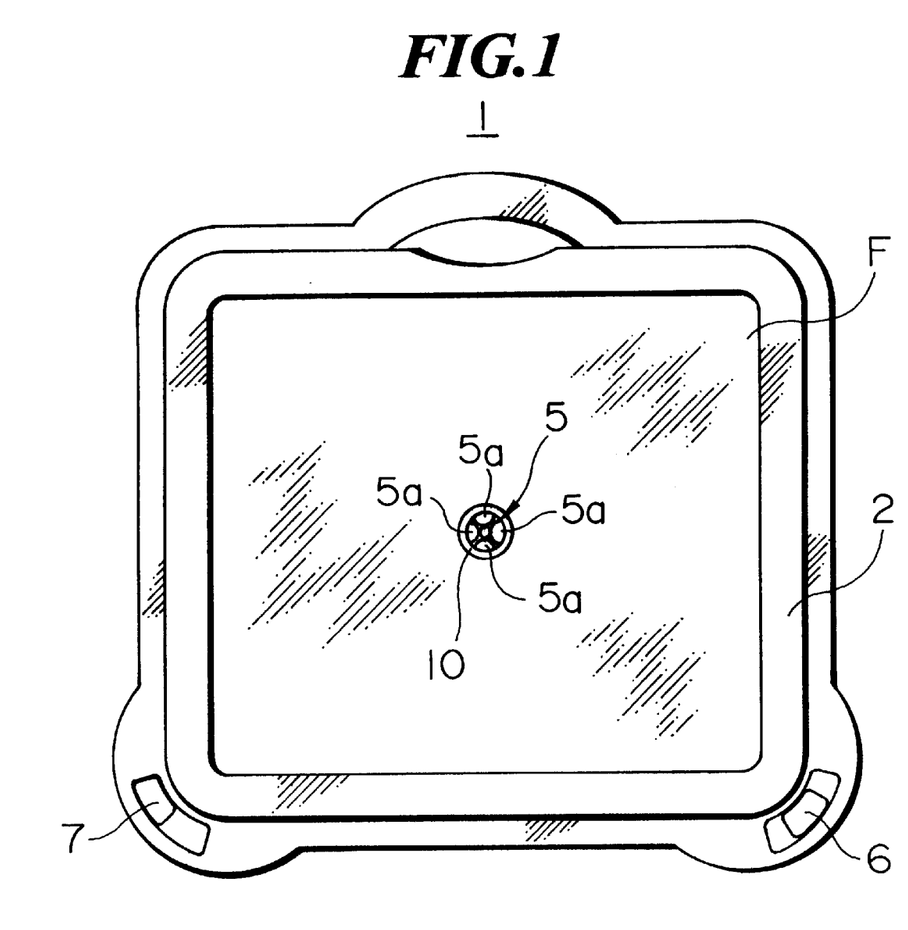
FIG. 1 is a plan view of a base member in an intellectual training toy according to an embodiment of the invention.
Figure 2:
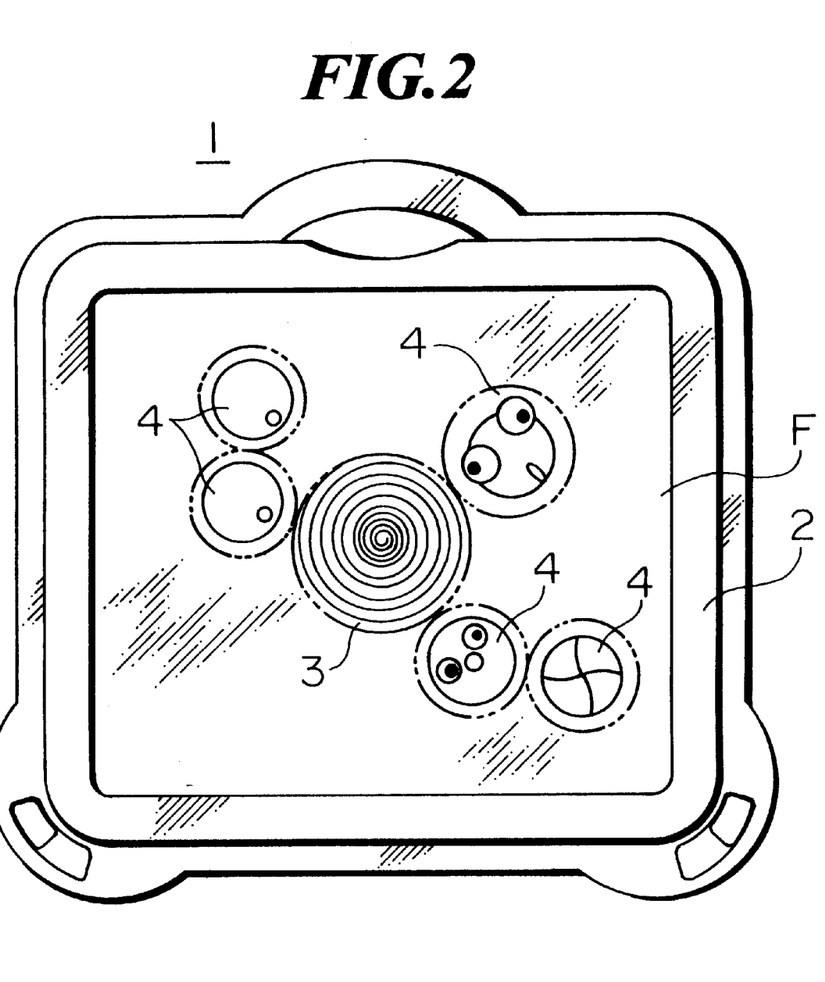
FIG. 2 is a plan view of an intellectual training toy according to the embodiment of the invention.

FIG. 1 is a plan view of a base member in an intellectual training toy according to an embodiment of the invention. The intellectual training toy 1 has the base member 2 having an approximate rectangular plate shape. On the base member 2, a driven member 4 can be engaged with a driving member 3 at will, as shown in FIG. 2.

In the inside of the base member 2, a rotary member 5 which has an approximate disc shape in plan and can be rotated by a motor or the like through a driving mechanism is provided at approximately the center position of the base member 2. The rotary member 5 is exposed through a circular opening 10 which is formed in the base member 2 at approximately the center position of a field portion F of the base member 2, as shown in FIG. 1. The circular opening 10 is formed to have a diameter suitable for the shaft 31 of the driving member 3 passing through the opening and for guiding therefor. In the upper surface of the rotary member 5, four recess portions each of which has a nail-like shape in plan are formed at 90° intervals along the periphery of the rotary member 5.

A first slide switch 6 is provided at a right corner position in this side of the base member 2. The slide switch 6 serves both as a power switch and a change-over switch for changing the rotation of the motor from normal direction to reverse one and vice versa. The slide switch 6 is disposed in an arc-shaped shallow groove and it can be slid along the groove from the upper right position to the lower left position through the central (middle) position, and vice versa. When the slide switch 6 is at the central position in the shallow groove, a circuit which is not shown, for driving the motor is opened to stop the motor M. When the slide switch 6 is moved to slide to the upper right position in the shallow groove, the circuit for driving the motor is closed to rotate the motor M and the rotary member 5 in one direction. On the other hand, when the slide switch 6 is moved to slide to the lower left position in the shallow groove, the circuit for driving the motor is closed to rotate the motor M and the rotary member 5 in the reverse direction.

A second slide switch 7 is provided at a left corner position in this side of the base member 2. The slide switch 7 is one for changing the rotational speed. The slide switch 7 is disposed in an arc-shaped shallow groove and it can be slid along the groove from the lower right position to the upper left, and vice versa. The rotational speeds of the motor M or the rotary member 5 can be changed by changing the position of the slide switch 7 lower right to upper left, or upper left to lower right. For example, the second slide switch 7 is mechanically communicated with a rotational speed changing member (lever) which can take first and second stable positions at which transmission of driving power from the motor M to the rotary member 5 is performed through trains of gears different from each other, as will be explained later.

Figure 3A:
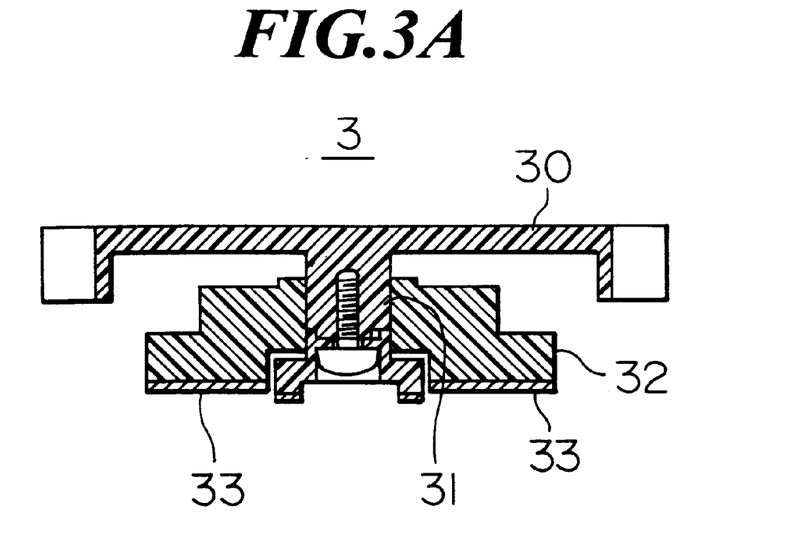
FIG. 3A is a vertical sectional view of an example of the driving member in the embodiment of the invention.
Figure 3B:
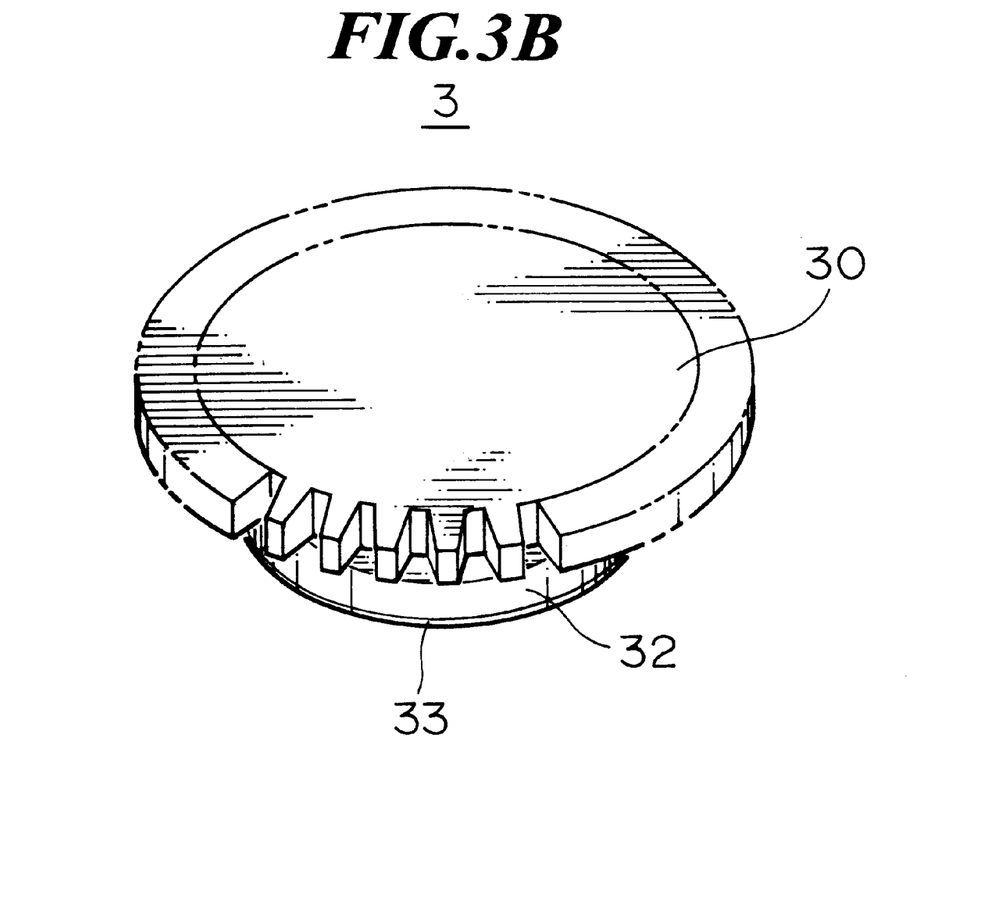
FIG. 3B is a perspective view of the example of the driving member.
Figure 4:
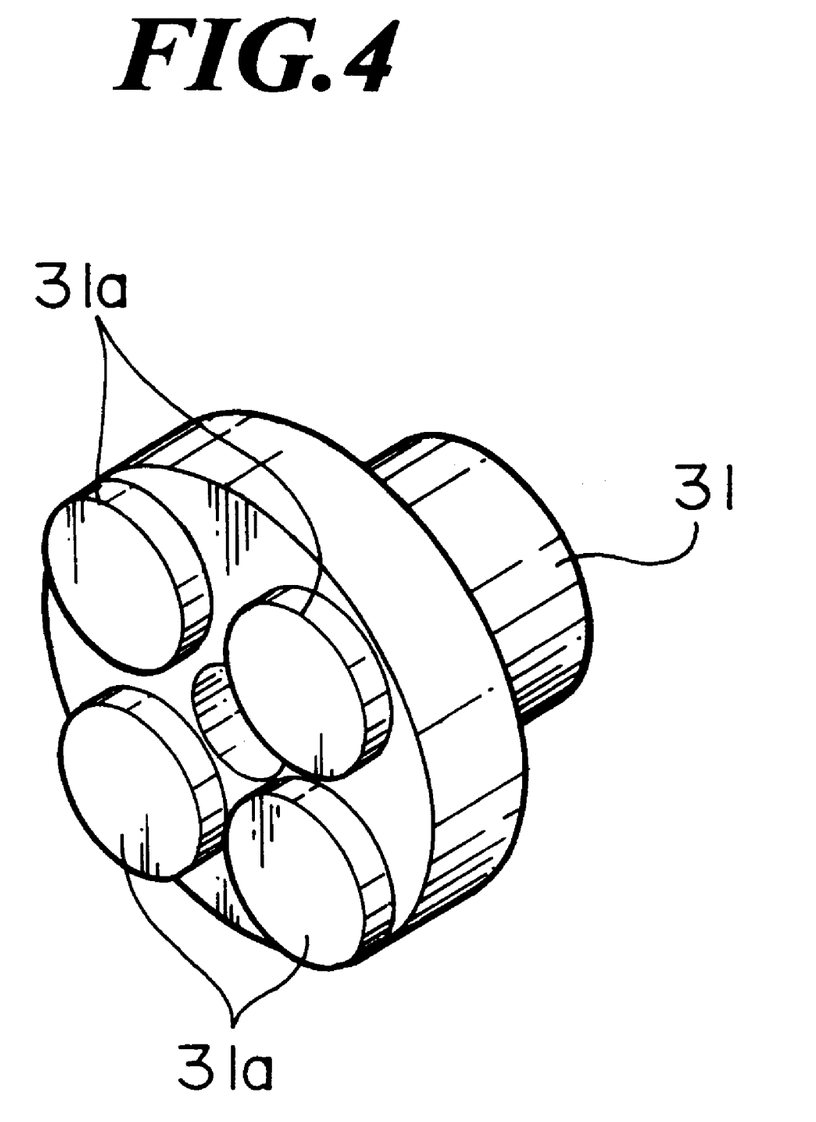
FIG. 4 is a perspective view of an example of the shaft portion of the driving member.

The driving member 3 has a spur gear 30, as shown in FIGS. 3A and 3B. On the lower surface of a bearing member (supporting member) 32 for supporting a rotary shaft 31 of the spur gear 30, a sheet of magnet 33 is adhered. The sheet of magnet 33 enables holding the driving member 3 on the field portion F of the base member 2 made of iron by magnetic attraction force. On the lower surface of the rotary shaft 31, four disc-shaped projections 31a are provided at 90° intervals along the periphery of the shaft 31, as shown in FIG. 4, so that the four projections 31a can be fitted in the four recess portions 5a formed on the upper surface of the rotary member 5, respectively. When the projections 31a are fitted in the recess portions 5a, rotational power of the rotary member 5 is transmitted to the spur gear 30 through the rotary shaft 31.

In this embodiment, the bearing member 32 of the driving member 3 is fixed to the field portion F of the base member 2 by magnetic attraction force while connecting the rotary member 5 to the driving member 3 by fitting the projections 31a in the recess portions 5a. However, it is not essential to fix the bearing member 32 of the driving member 3 to the field portion F. For example, transmission of rotational power of the rotary member 5 to the driving member 3 can be also carried out by fitting the shaft 31 of the driving member 3 in the rotary member 5, by fitting the rotary member 5 in the shaft 31, or by connecting the rotary member 5 and the shaft 31 by screwing.

Figure 5A:
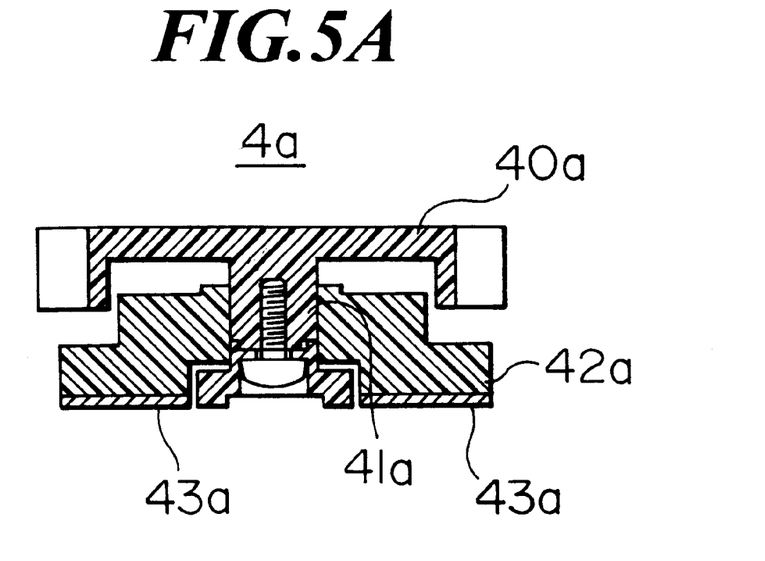
FIG. 5A is a vertical sectional view of an example of a driven member in the embodiment of the invention.
Figure 5B:
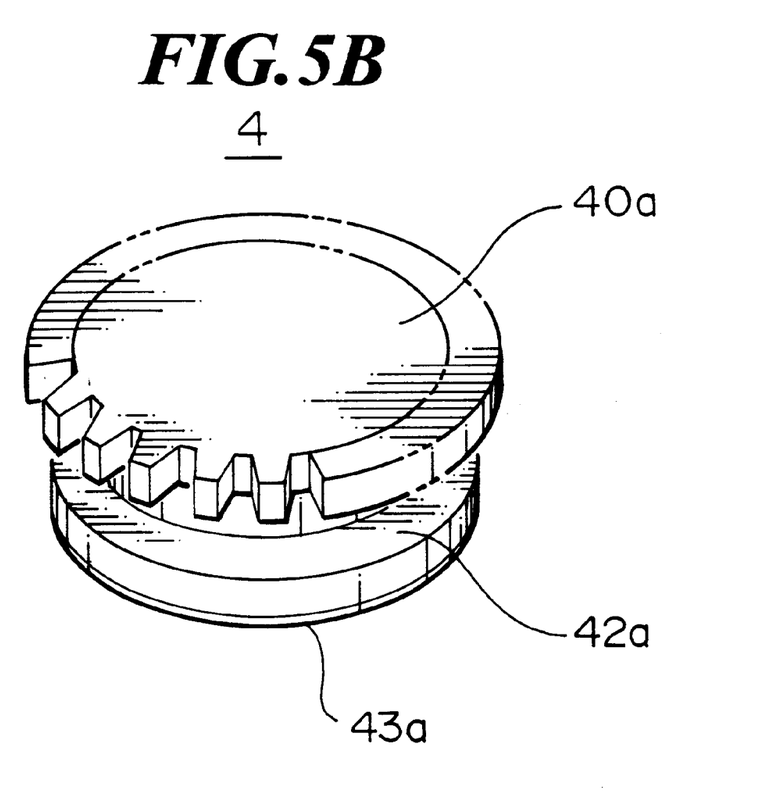
FIG. 5B is a perspective view of the example of the driven member.
Figure 6:
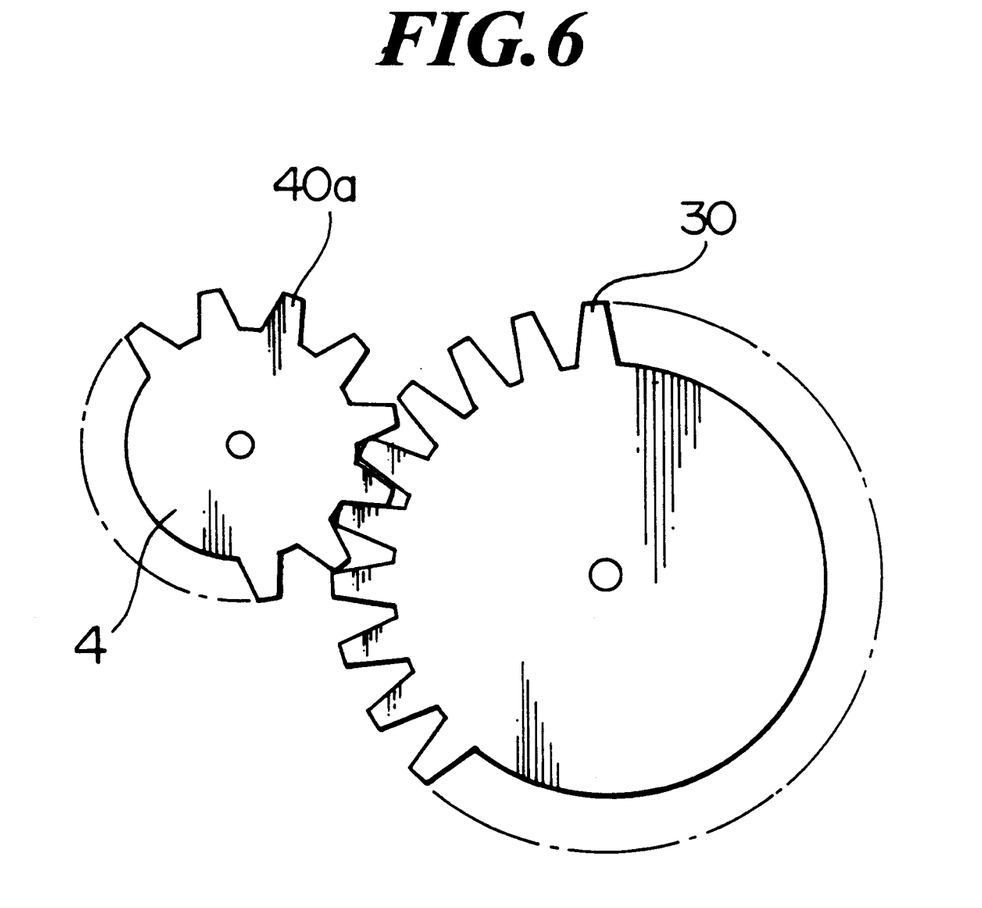
FIG. 6 is a plan view showing an engagement of the driving member with the first driven member.

A first example of the driven member 4 will be explained with reference to FIGS. 5A and 5B. The driven member 4a according to the first example is provided with a spur gear 40a which can engage with the spur gear 30 of the driving member 3, as shown in FIG. 6. On the lower surface of a bearing member (supporting member) 42a for supporting a rotary shaft 41a of the spur gear 40a, a sheet of magnet 43a is adhered. The sheet of magnet 43a enables holding the driven member 4a on the field portion F of the base member 2 made of iron, by magnetic attraction force.

Figure 7A:
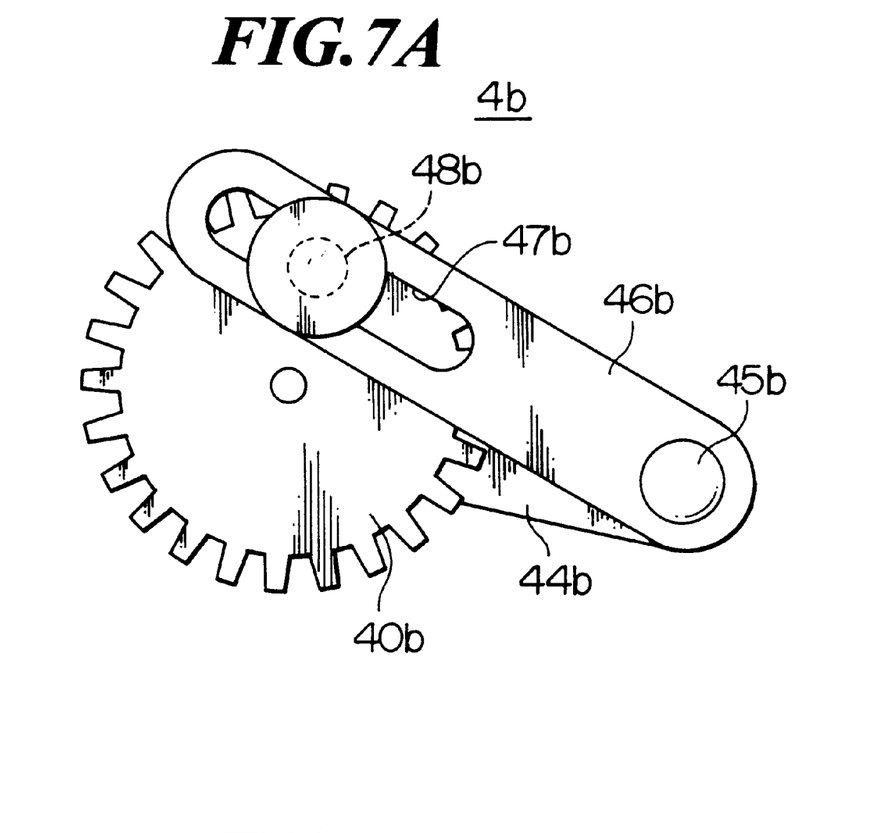
FIG. 7A is a plan view of second example of the driven member in the embodiment of the invention.
Figure 7B:
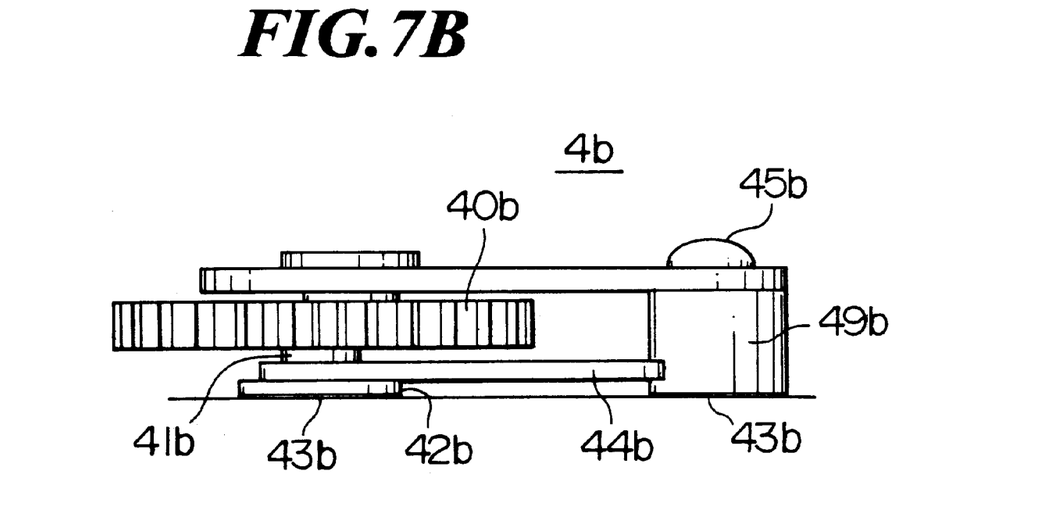
FIG. 7B is a front view thereof.

A second example of the driven member 4 will be explained with reference to FIGS. 7A and 7B. The driven member 4b according to the second example is provided with a spur gear 40b which can engage with the spur gear 30 of the driving member 3. A magnet layer 43b is provided on the lower surface of a bearing member (supporting member) 42b for supporting a rotary shaft 41b of the spur gear 40b. The sheet of magnet 43b enables holding the driven member 4b on the field portion F of the iron base member 2, by magnetic attraction force. On a lower portion of the rotary shaft 41b of the spur gear 40b, an end of an arm 44b is provided so that the shaft 41b can be rotated. At the other end of the arm 44b, a cylindrical supporting member 49b containing a shaft 45b is attached. On an upper portion of the shaft 45b, a link 46b is provided to rotate around the shaft 45b. In the link 46b, a long hole 47b with a uniform width is formed from near the other end thereof to the approximate center portion. A pin 48b is attached at an eccentric position on the upper surface of the spur gear 40b through the long hole 47b so that the pin 48b can slide in the long hole 47b. On the lower surface of supporting member 49b, a sheet of magnet 43b is adhered. Therefore, when engaging the spur gear 40b with the spur gear 30 of the driving member 3, while fixing the driven member 4b to the field portion F of the base member 2 by magnetic attraction force of the sheets of magnet 43b, the spur gear 40b is rotated by the rotation of the spur gear 30 while the link 46b is swung on the shaft 45b.

Figure 8:
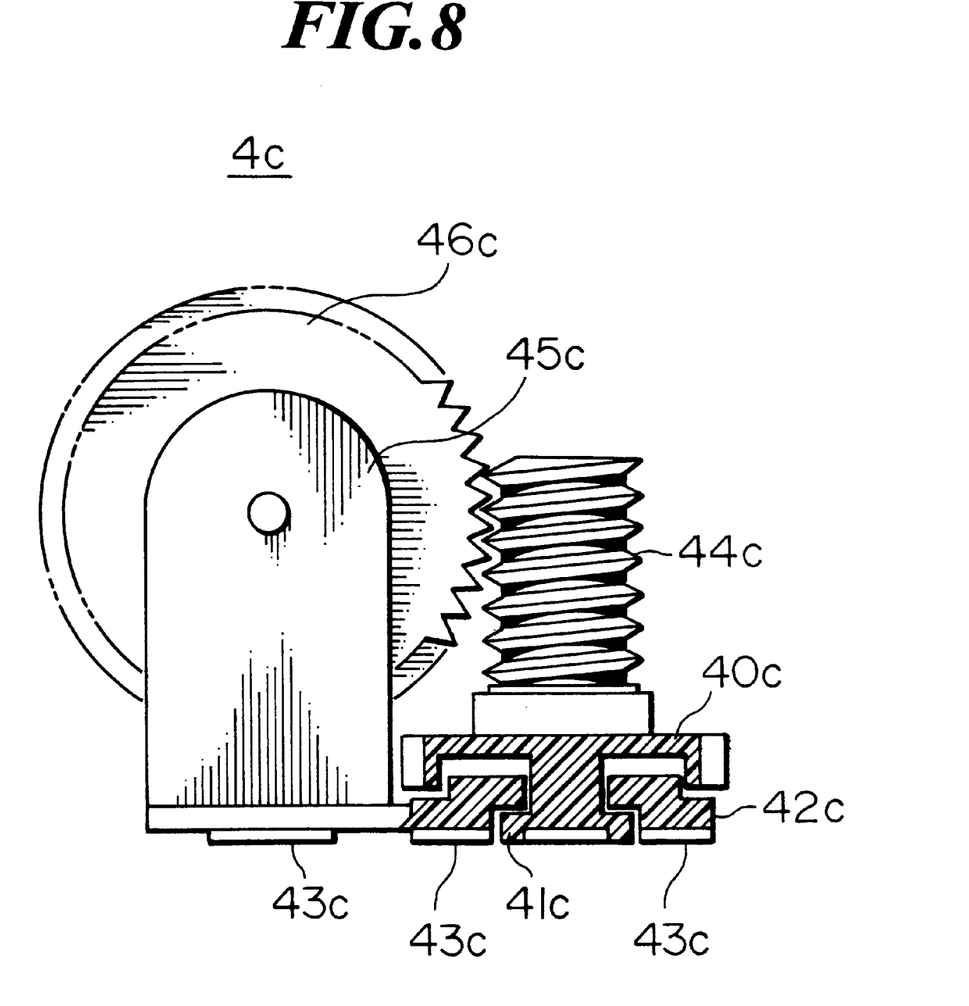
FIG. 8 is a front view of a third example of the driven member in the embodiment of the invention.

A third example of the driven member 4 will be explained with reference to FIG. 8. The driven member 4c according to the third example is provided with a spur gear 40c which can engage with the spur gear 30 of the driving member 3. A magnet layer 43c is provided on the lower surface of a first bearing member (supporting member) 42c for supporting a rotary shaft 41c of the spur gear 40c. The sheet of magnet 43c enables holding the driven member 4c on the field portion F of the base iron member 2 by magnetic attraction force. On the upper surface of the spur gear 40c, a screw gear 44c is attached. A second bearing member 45c is erected to attach to the first bearing member 42c. A spur gear 46c is provided to rotate on a shaft which is horizontally supported by the second bearing member 45c, while the spur gear 46c engages the screw gear 44c.

According to the driven member 4c having such a structure, when engaging the spur gear 40c with the spur gear 30 of the driving member 3, while fixing the driven member 4c to the field portion F of the base member 2 by magnetic attraction force of the sheet of magnet 43c, the spur gear 40c is rotated by the rotation of the spur gear 30 while the spur gear 46c is rotated through the screw gear 44c.

An example of the internal structure of the base member 2 will be explained, as follows.

A battery box which is not shown in figures, for setting one or several batteries therein is provided in the base member 2.

Figure 9:
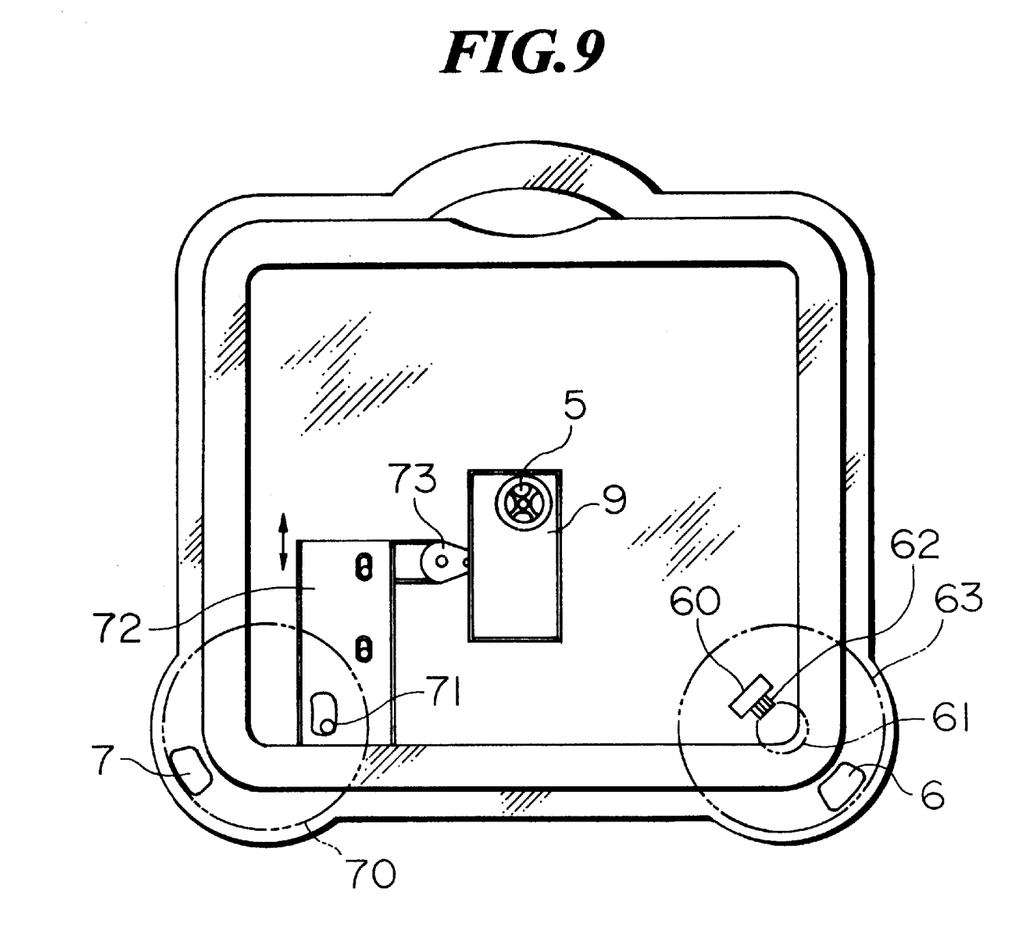
FIG. 9 is a plan view for showing the inside of the base member in the intellectual training toy according to the embodiment of the invention.
Figure 10:
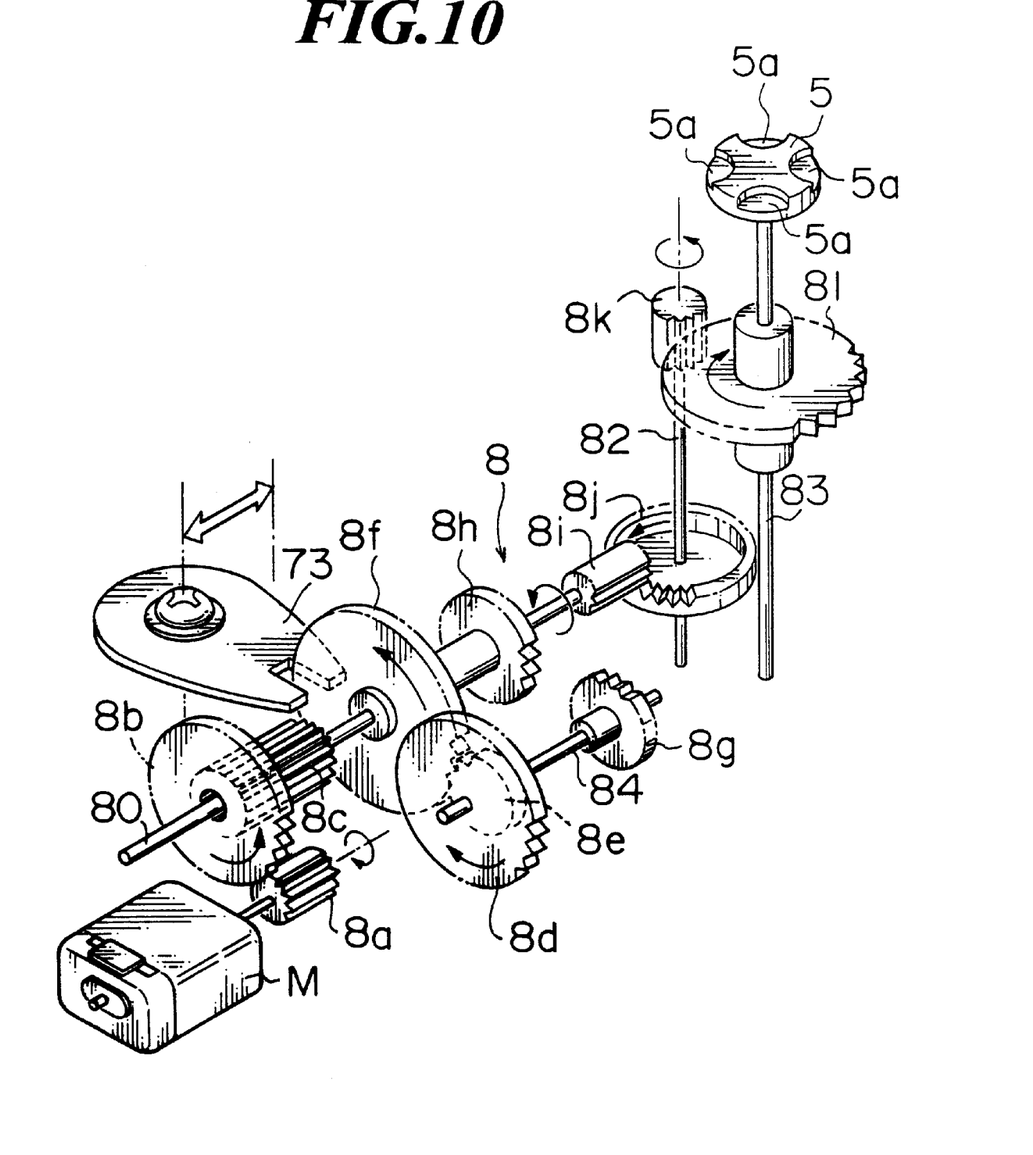
FIG. 10 is a perspective view of an example of a driving mechanism of the intellectual training toy according to the embodiment of the invention.

In a mechanical box 9 shown in FIG. 9, in the base member 2, a motor M which is rotatable in both directions and a driving mechanism 8 are provided, as shown in FIG. 10. A gear 8a is attached to a rotary shaft of the motor M and is engaged with a gear 8b which is rotated on and supported by a horizontal shaft 80. The horizontal shaft 80 is arranged in parallel with the rotary shaft of the motor M. To the gear 8b, a gear 8c is attached integrally. The gear 8c engages with a gear 8d which is rotatable on a horizontal shaft 84 and is attached fixedly to an end of the horizontal shaft. On the horizontal shaft 84, a gear 8e is provided to attach to the gear 8d integrally and can engage with a gear 8f which is provided on the horizontal shaft 80 fixedly. On, the other end the horizontal shaft 84, a gear 8g is provided fixedly and can engage with a gear 8h which is provided on the horizontal shaft 80 fixedly. On the horizontal shaft 80, a gear 8i is provided fixedly and can engage with a gear 8j which is provided on an end of a vertical shaft 82 fixedly. The vertical shaft 82 is provided in a direction perpendicular to the horizontal shaft 80. On the other end of the vertical shaft 82, a gear 8k is provided fixedly to engage with a gear 81 which is provided on another vertical shaft 83 fixedly. The rotary member 5 is provided on an end of the vertical shaft 83.

In the driving mechanism 8, the driving power of the motor M is transmitted to the rotary member 5 either through the route of the gears 8a–8d, 8e, 8f, 8i, and 8j–8l or the route of the gears 8a–8d, 8g, 8h, 8i, and 8j–8l.

Selection of the route of the gears for transmission of the driving power can be carried out by a lever 73 for changing the rotational speed, which is connected to the second slide switch 7. That is, the slide switch 7 is attached to a peripheral portion on the upper surface of a rotatable disc plate 70 which has an eccentric pin 71 on the lower surface thereof, as shown in FIG. 9. The eccentric pin 71 is engaged with a slide plate 72 which supports the lever 73 for changing the rotational speed, attached to a side surface thereof. The slide plate 72 can be moved in the direction of the arrow shown in this figure according to the movement of the eccentric pin 71 in the arrow direction. The lever 73 for changing the rotational speed has two branches which put the gear 8f in the driving mechanism 8 between them.

When rotating the disc plate 70 in the counterclockwise direction by moving the slide switch 7 in the lower right direction, in FIG. 9, the eccentric pin 71 moves the slide plate 72 upwardly with the lever 73 for changing the rotational speed. The movement of the lever 73 brings a movement of the gears 8f, 8h, and 8i in the direction of the horizontal shaft 80 to push the gears 8f and 8e out of mesh and to bring the gears 8g and 8h into mesh. As a result, the transmission of the driving power is changed from the route of the gears 8a–8d, 8e, 8f, 8i, and 8j–8l to the route of the gears 8a–8d, 8g, 8h, 8i, and 8j–8l. Thus, it is possible to change the rotational speed of the rotary member 5.

Changing the direction of rotation is carried out by a rotary switch 60 which is connected to the first slide switch 6. That is, the slide switch 6 is attached to a peripheral portion on the upper surface of a rotatable disc plate 63 which has a crown gear 61 attached on the lower surface thereof, as shown in FIG. 9. The crown gear 61 is engaged with a gear 62 which is connected with the rotary switch 60.

When rotating the disc plate 63 in a direction by moving the slide switch 6, the crown gear 61 rotates in the direction to rotate the gear 62. The rotation of the gear 62 provides a rotation in one direction to the rotary switch 60, thereby changing the rotation of the motor, e.g., from normal direction to reverse one, is performed. When rotating the disc plate 63 in the reverse direction by moving the slide switch 6 in the reverse direction, changing the rotation of the motor, e.g., from reverse direction to normal, can be performed.

Although a rotary switch 60 is used for changing the rotation of the motor, in the embodiment, the invention is not limited to use of a rotary switch, various types of switches can be also used.

According to such a toy 1 of the embodiment, because the first driven member 4 can be held at a desired position on the field portion F of the base member by magnetic attraction force, it is possible to enhance the freedom for arrangement of the driven member and to increase interest thereto. Because it is possible to easily connect the acting portion of the first driven member 4 to the spur gear 30 of the driving member 3 from the direction along the upper surface of the field portion F, even while the spur gear 30 of the driving member 3 is rotating, it is unnecessary to stop the rotation of the spur gear 30 of the driving member 3 prior to connecting the first driven member 4 thereto.

Further, according to the toy 1 of the embodiment, it is possible to connect the driving member 3 to the rotary member 5 easily and surely, by fitting the shaft 31 of the rotary portion of the driving member 3 with a portion of the exposed rotary member 5.

Although some embodiments of the invention have been explained as described above, it should also be understood that the present invention is not limited to the embodiments and that various changes and modifications may be made to the invention without departing from the gist thereof.

The entire disclosure of Japanese Utility Model Application No. Jitsugan hei-9-9281 filed on Oct. 20, 1997 (Japanese Utility Model Registration No. 3,048,222; registered on Feb. 18, 1998) including specification, claims, drawings and summary are incorporated herein by reference in its entirety.

What is claimed is:

1. A toy comprising:
   a base member which has a driving mechanism built-in and a field portion having an approximately smooth surface;
   a rotary member having recess portions, which is engaged with the driving mechanism and is rotatable around an axis perpendicular to the smooth surface of the field portion;
   a driving member having a rotary portion and projections which can be fitted in the recess portions of the rotary member, the driving member being attachable to the field portion of the base member so that the projections of the driving member are fitted in the recess portions of the rotary member to rotate the rotary portion according to and coaxially with a rotation of the rotary member; and
   a first driven member which can be held at a position on the field portion of the base member by a magnetic attraction force and can engage with the rotary portion of the driving member while being held on the field portion of the base member by the magnetic attraction force, the first driven member having a first acting portion which takes action according to the rotation of the rotary portion.

2. A toy as claimed in claim 1, wherein one of the field portion of the base member and the first driven member is made of magnetic material and the other of the field portion and the first driven member is made of magnet.

3. A toy as claimed in claim 1, wherein the rotary member is exposed from the field portion.

4. A toy as claimed in claim 1, wherein each of the rotary portion of the driving member and the acting portion of the first driven member comprises a gear which can engage with each other.

5. A toy as claimed in claim 1, wherein the rotary portion of the driving member forms a crank, and the rotary portion of the driving member and the acting portion of the first driven member form a linkage.

6. A toy as claimed in claim 1, further comprising a second driven member which can be held at a desired position on the field portion of the base member by another magnetic attraction force and can engage with the first driven member while being held on the field portion of the base member by the another magnetic attraction force, the second driven member having an acting portion which takes action according to the action of the first driven member.

7. A toy as claimed in claim 1, further comprising a first slide switch for changing a rotational direction of the rotary member.

8. A toy as claimed in claim 7, further comprising a second slide switch for changing a rotational speed of the rotary member by a movement thereof.

9. A toy as claimed in claim 8, further comprising a motor which is connected with the driving mechanism, wherein the second slide switch is mechanically communicated with a rotational speed changing member which can take first and second stable positions at which transmission of driving power from the motor to the rotary member is performed through trains of gears different from each other.

10. A toy as claimed in claim 9, wherein the rotational speed changing member has two branches which put a gear in the driving mechanism between them to move the gear by changing one of the first and second stable positions of the rotational speed changing member to the other, in order to change a train of gears used for transmission of driving power from the motor to the rotary member.

11. A toy comprising:
    a base member which has a driving mechanism built-in and a field portion having an approximately smooth surface, wherein a circular opening is formed in the base member;
    an approximately disc-shaped rotary member including a plurality of recess portions in an upper surface exposed through the circular opening of the base member, the disc-shaped rotary member being engaged with the driving mechanism and rotatable around an axis perpendicular to the smooth surface of the field portion;
    a driving member having a rotary portion and a plurality of disc-shaped projections in a lower surface, the driving member being attachable to the field portion of the base member so that the disc-shaped projections can be fitted in the plurality of recess portions of the rotary member through the circular opening of the base member to rotate the rotary portion according to a rotation of the rotary member; and
    a driven member which can be held at a position on the field portion of the base member by a magnetic attraction force and can engage the rotary portion of the driving member while being held on the field portion of the base member by the magnetic attraction force, the driven member having an acting portion which takes action according to the rotation of the rotary portion.

12. A toy as claimed in claim 11, wherein the driving member comprises a spur gear with a central rotary shaft, a bearing member for supporting the rotary shaft, and a sheet of magnet adhered on a lower surface of the bearing member.

13. A toy, comprising:

a base having an approximately smooth surface with a hole;

a driving mechanism comprising a motor and a drive shaft, said driving mechanism being connected to said base so that said shaft is rotatable about an axis perpendicular to said smooth surface;

a rotary member positioned on said shaft, said rotary member further comprising a first engagement surface formed thereon the first engagement surface being exposed within said hole;

a driving member comprising a rotary portion having a second engagement surface that is engageable with said first engagement surface of said rotary member so that rotation of the rotary member rotates said rotary portion; and at least one driven member engageable with said driving member through a first acting portion that acts in response to rotation of said rotary portion; said driven member being engeable with said smooth surface by a magnetic attraction force.

14. A toy comprising:

a base member having a built-in driving mechanism and a field portion having an approximately smooth surface;

a rotary member having gap regions formed between adjacent raised areas, said rotary member being engaged with the driving mechanism and being rotatable around an axis perpendicular to the smooth surface of the field portion;

a driving member having a rotary portion and projections which can be fitted in the gap regions of the rotary member, the driving member being attachable to the field portion of the base member so that the projections of the driving member are fitted in the gap regions of the rotary member to rotate the rotary portion according to rotation of the rotary member; and a first driven member which can be held at a position on the field portion of the base member by a magnetic attraction force and can engage with the rotary portion of the driving member while being held on the field portion of the base member by the magnetic attraction force, the first driven member having a first engagement area which acts according to and coaxially with rotation on the rotary portion.

* * * * *